US008705447B2

(12) United States Patent
Choi

(10) Patent No.: US 8,705,447 B2
(45) Date of Patent: Apr. 22, 2014

(54) REMOTE CONTROL METHOD AND SYSTEM, AND REMOTE CONTROL METHOD OF A MOBILE DEVICE

(75) Inventor: Woo Hyuk Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 753 days.

(21) Appl. No.: 12/943,475

(22) Filed: Nov. 10, 2010

(65) Prior Publication Data

US 2011/0113345 A1 May 12, 2011

(30) Foreign Application Priority Data

Nov. 10, 2009 (KR) ........................ 10-2009-0107876

(51) Int. Cl.
*H04W 4/00* (2009.01)
(52) U.S. Cl.
USPC ......................................... 370/328; 370/338
(58) Field of Classification Search
None
See application file for complete search history.

(56) References Cited

U.S. PATENT DOCUMENTS

| 4,788,657 | A | * | 11/1988 | Douglas et al. ................ 710/104 |
| 5,931,913 | A | * | 8/1999 | Meriwether et al. ........... 709/227 |
| 7,046,161 | B2 | * | 5/2006 | Hayes ......................... 340/12.25 |
| 7,135,962 | B2 | * | 11/2006 | Durbin et al. .............. 340/425.5 |
| 7,301,935 | B1 | * | 11/2007 | Chaturvedi et al. ........... 370/352 |
| 8,320,904 | B1 | * | 11/2012 | Celentano et al. ............ 455/423 |
| 2005/0135294 | A1 | * | 6/2005 | Do ................................ 370/328 |
| 2006/0209802 | A1 | * | 9/2006 | Kang et al. ..................... 370/352 |
| 2007/0248070 | A1 | * | 10/2007 | Choi ............................. 370/338 |
| 2009/0061841 | A1 | * | 3/2009 | Chaudhri et al. ............. 455/420 |
| 2011/0113345 | A1 | * | 5/2011 | Choi ............................. 715/740 |

FOREIGN PATENT DOCUMENTS

KR 10-0690242 B1 4/2006

* cited by examiner

*Primary Examiner* — Robert Wilson
(74) *Attorney, Agent, or Firm* — Jefferson IP Law, LLP

(57) ABSTRACT

A remote control method and system of a mobile device are provided. The method includes connecting a host terminal to a Packet Data Serving Node (PDSN) and allocating a first Internet Protocol (IP) address to the host terminal when a remote control mode is executed, creating, by the host terminal, a text message containing the first IP address and transmitting the text message to a client terminal, connecting the client terminal to the PDSN and allocating a second IP address to the client terminal, establishing a data communication channel between the host terminal and the client terminal using the first IP address and the second IP address, and remotely controlling, by the host terminal, the client terminal via the data communication channel.

18 Claims, 5 Drawing Sheets

REMOTE CONTROL METHOD AND SYSTEM, AND REMOTE CONTROL METHOD OF A MOBILE DEVICE

PRIORITY

This application claims the benefit under 35 U.S.C. §119 (a) of a Korean patent application filed on Nov. 10, 2009 in the Korean Intellectual Property Office and assigned Serial No. 10-2009-0107876, the entire disclosure of which is hereby incorporated by reference.

BACKGROUND OF THE INVENTION

1. Field of the Invention

The present invention relates to remote control technology. More particularly, the present invention relates to a remote control method and system of a mobile device.

2. Description of the Related Art

Recently, with the development of technology in the field of electronic systems, mobile devices have provided a variety of functions such as a voice call, text message transmission/reception, image capture, audio file playback, digital broadcast service, E-mail service, instant messenger, packet data communication, and the like. In addition, mobile devices can also store additional information, such as phone numbers, a schedule, photographs, an accredited certificate, and the like.

As such, while mobile devices have many advantages because they provide a variety of functions, such functions may inconvenience the mobile device users. For example, if a user lost his/her mobile device in which user data is stored, he/she may be inconvenienced. That is, if the person who found the mobile device uses it maliciously, such as disclosing the mobile device owner's personal information or using charged services, the mobile device loser may experience serious problems as a result. On the other hand, if a user cannot temporarily use his/her mobile device, for example, leaving home without carrying the mobile device, he/she cannot use information stored in the mobile device and thus can feel inconvenienced.

Therefore, a need exists for a method and system for remotely controlling a mobile device.

SUMMARY OF THE INVENTION

An aspect of the present invention is to address at least the above-mentioned problems and/or disadvantages and to provide at least the advantages described below. Accordingly, an aspect of the present invention is to provide a method and system for remotely controlling a mobile device using a particular mobile device, without installing additional systems, such as servers, to a mobile communication network.

In accordance with an aspect of the present invention, a remote control method is provided. The method includes connecting a host terminal to a Packet Data Serving Node (PDSN) and allocating a first Internet Protocol (IP) address to the host terminal when a remote control mode is executed, creating, by the host terminal, a text message for requesting the remote control mode, containing the first IP address, and transmitting the text message to a client terminal, connecting the client terminal to the PDSN and allocating a second IP address to the client terminal, establishing a data communication channel between the host terminal and the client terminal using the first IP address and the second IP address, and remotely controlling, by the host terminal, the client terminal via the data communication channel.

In accordance with another aspect of the present invention, a remote control system is provided. The system includes a host terminal for transmitting a remote control request text message in a remote control mode, a client terminal for receiving the remote control request text message, a Short Message Service Center (SMSC) for forwarding the remote control request text message from the host terminal to the client terminal, and a Packet Data Serving Node (PDSN) for allowing a connection of the host terminal and the client terminal and allocating a first IP address and a second IP address to the host terminal and the client terminal, respectively. The remote control request text message includes the first IP address. The host terminal transmits the remote control request text message to the client terminal via the SMSC. The client terminal establishes a data communication channel with the host terminal via the PDSN, using the first IP address and the second IP address.

In accordance with still another aspect of the present invention, a remote control method of a mobile device is provided. The method includes acquiring a first IP address when a remote control mode is executed, receiving a phone number of a client terminal to be remotely controlled, creating a remote control request text message, containing the phone number, the first IP address, and an identifier representing that the text message requests the remote control, transmitting the remote control request text message to the client terminal, receiving a data communication channel connection request from the client terminal, transmitting a message for accepting the data communication channel connection request to the client terminal and establishing the data communication channel with the client terminal, and receiving a user interface screen of the client terminal via the data communication channel and remotely controlling the client terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
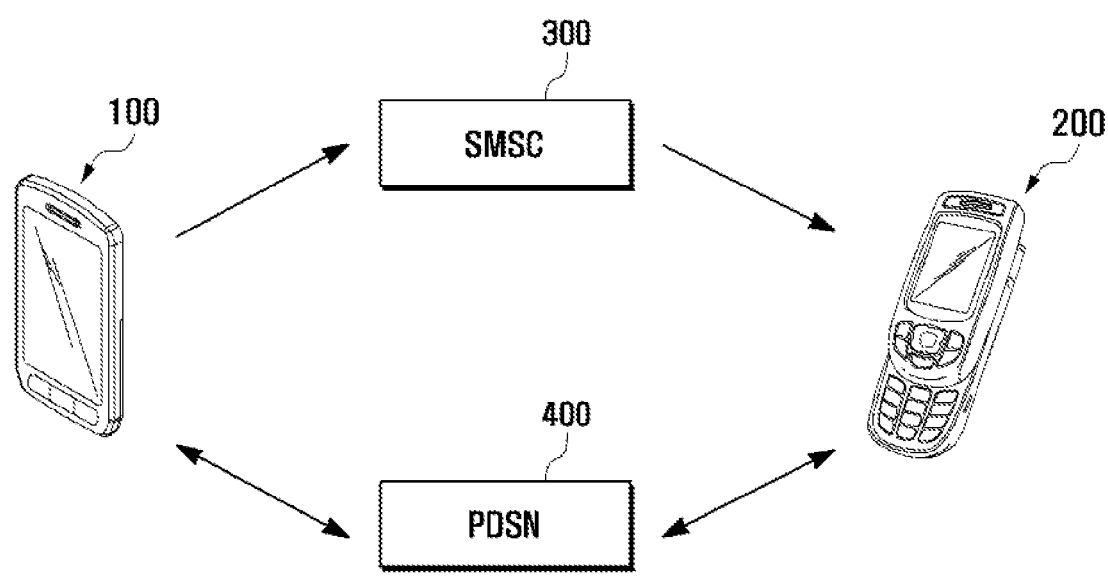
FIG. 1 illustrates a diagram of a system for remotely controlling a mobile device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms or words used in the following descriptions and claims are not limited to the bibliographic meaning, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term 'host terminal' denotes a mobile device that performs remote control. The term 'client terminal' denotes a mobile device that is remotely controlled. The terms 'host terminal' and 'client terminal' are used as a relative concept. That is, a host terminal serves as a client terminal and vice versa.

During a remote control mode, the host terminal is connected to a Packet Data Serving Node (PDSN) and allocated with a first Internet Protocol (IP) address, creates a remote control request text message containing a first IP address, and transmits the remote control request text message to the client terminal. The client terminal receives the remote control request text message, is connected to the PDSN, is allocated with a second IP address, and establishes a data communication channel for remote control with the host terminal, based on the first IP address and a second IP address. The data communication channel may be a Peer To Peer (P2P) communication channel using Point to Point Protocol (PPP). The host terminal may receive a user interface screen from the client terminal via the data communication channel. After receiving the user interface screen, the host terminal may transmit operation signals for remotely controlling the client terminal to the client terminal via the data communication channel. The client terminal performs a function corresponding to the received operation signal and may transmit a screen altered as the function is performed to the host terminal. For example, if the host terminal transmits an operation signal for verifying a call list to the client terminal, the client terminal displays a call list screen and transmits the call list to the host terminal Therefore, the user may easily verify the call list of the client terminal via the host terminal.

FIG. 1 illustrates a diagram of a system for remotely controlling a mobile device according to an exemplary embodiment of the present invention.

Referring to FIG. 1, a system for remotely controlling a mobile device (i.e., a remote control system) includes a host terminal 100, a client terminal 200, a Short Message Service Center (SMSC) 300, and a Packet Data Serving Node (PDSN) 400.

The host terminal 100 requests remote control from the client terminal 200. The host terminal 100 may include a mobile communication device, a PDA, a smart phone, and the like, which may perform text message transmission and reception and be connected to the PDSN 400. When a remote control mode is executed, the host terminal 100 is connected to the PDSN 400 and allocated with a first IP address. The host terminal 100 may also receive the first pre-allocated IP address from the PDSN 400. If the PDSN 400 uses a private IP, the host terminal 100 may further receive a first port number from the PDSN 400. In an exemplary implementation, it is assumed that the PDSN 400 uses the private IP. In addition, during the remote control mode, the host terminal 100 displays a screen for allowing a user to input setting information, such as a phone number of the client terminal 200 requested for remote control and a first authentication number for authenticating the remote control. If a procedure for authenticating remote control is not performed, the host terminal 100 may display only a setting information inputting screen for allowing the user to input only the phone number of the client terminal 200. In an exemplary embodiment of the present invention, a description is made by assuming that the procedure for authenticating a remote control is performed.

The host terminal 100 may create a text message containing the phone number of the client terminal 200, the first IP address, the first port number, and the first authentication number. The host terminal 100 may insert an identifier, representing a text message for requesting the remote control to a header of the text message, for example, a Protocol IDentifier (PID) area. Since a transmission format of the text message follows the standard transmission and is well-known to the ordinary skilled person in the art, a detailed description of the transmission format will be omitted.

Thereafter, the host terminal 100 transmits the created text message to the client terminal 200 via the SMSC 300. When the host terminal 100 receives a data communication channel connection request from the client terminal 200, the host terminal 100 establishes a data communication channel for remote control with the client terminal 200 and allows the user to remotely control the client terminal 200. In order to perform the remote control, the host terminal 100 may receive a user interface screen (e.g., an idle screen) of the client terminal 200. The host terminal 100 may further receive information regarding the client terminal 200, for example, resolution or size of the display unit, an input mode, a key map, and the like, and may properly alter the user interface screen of the client terminal 200 according to the additionally received information. For example, the host terminal 100 may display the user interface screen on the entire screen or may alter the user interface screen to a smaller screen than an entire screen of the display unit and display the user interface screen with a small size on the screen. If the host terminal 100 has the same resolution as the client terminal 200, the host terminal may skip the process of altering the user interface screen. In addition, the host terminal 100 may further display a pointer or virtual keypad according to the type of input modes, which will be described, in more detail below with reference to FIG. 4.

The client terminal 200 is remotely controlled by the host terminal 100. The client terminal 200 may include a mobile communication device, a PDA, a smart phone, and the like, which may perform text message transmission and reception and be connected to the PDSN 400.

When the client terminal 200 receives a text message, the client terminal 200 may identify the header of the received text message, for example, the PID area. If the received text message contains an identifier for requesting remote control, the client terminal 200 extracts the first authentication number, the first IP address, and the first port number from the text message, and compares the first authentication number with a second authentication number stored therein.

If the first authentication number and the second authentication number are consistent with each other, the client terminal 200 is connected to the PDSN 400 and allocated with a second IP address and a second port number. Thereafter, the client terminal 200 is connected to the host terminal 100 via the data communication channel, using the first IP address and the first port number contained in the text message, and its allocated second IP address and second port number. When the client terminal 200 and the host terminal 100 are connected to each other via the data communication channel, the client terminal 200 may transmit the terminal information containing the resolution, the input mode, the key map, and the like, to the host terminal 100. This is to allow the host terminal 100 to properly alter its user interface screen environment to the screen environment of the client terminal 200 based on the terminal information regarding the client terminal 200 if the terminal information differs between the host terminal 100 and the client terminal 200.

Thereafter, the client terminal 200 transmits the user interface screen to the host terminal 100, performs a particular function according to an operation signal transmitted from the host terminal 100, and transmits the screen performing the function to the host terminal 100. This process is repeated until the remote control mode is terminated.

On the contrary, if the first authentication number and the second authentication number are not consistent with each other, the client terminal 200 creates an error message stating that the first authentication number and the second authentication number are not consistent and transmits the error message to the host terminal 100. The error message may be transmitted to the host terminal 100 as a text message or via the data communication channel using the first IP address and the first port number.

Meanwhile, the client terminal 200 may perform all of the operations in a state where the background screen is being displayed until the remote control is terminated since the client terminal 200 has received the text message for requesting the remote control. Therefore, the remote control state cannot be exposed from the client terminal 200, That is, the person who found the client terminal 200 cannot recognize the remote control operation in the client terminal 200. Accordingly, the owner of the client terminal 200 may remotely set the password in the client terminal 200 without the person who found the client terminal 200 recognizing the set password, thereby preventing the person from using the client terminal 200 maliciously.

The Short Message Service Center (SMSC) 300 provides a short message transmission service via a mobile communication network, for example, a Code Division Multiplex Access (CDMA) network, a Global System for Mobile (GSM) network, and the like. More particularly, the SMSC 300 forwards a text message for requesting remote control by the host terminal 100 to the client terminal 200. If the authentication numbers are not consistent between the host terminal 100 and the client terminal 200, the SMSC 300 receives an error message transmitted from the client terminal 200 and transmits the error message to the host terminal 100. In addition, if the SMSC 300 receives the text message containing the authentication number re-transmitted from the host terminal 100 that has received the error message, the SMSC 300 transmits the received text message to the client terminal 200.

The Packet Data Serving Node (PDSN) 400 establishes a data communication channel between the host terminal 100 and the client terminal 200 via Point to Point Protocol (PPP). Additionally, the PDSN 400 is connected to the host terminal 100 and the client terminal 200 and allocates IP addresses and port numbers to the host terminal 100 and the client terminal 200, respectively. The PDSN 400 receives a message for requesting data communication channel connection from the client terminal 200 and transmits the message to the host terminal 100. If the host terminal 100 accepts the data communication channel connection, the PDSN 400 transmits a message for accepting the data communication channel connection to the client terminal 200. The PDSN 400 may provide data transmission services, in real time, between the host terminal 100 and the client terminal 200. For example, if a data communication channel for remote control has been established, the PDSN 400 forwards the user interface screen, transmitted from the client terminal 200, to the host terminal 100. In addition, the PDSN 400 also forwards operation signals for remotely controlling the client terminal 200, transmitted from the host terminal 100, to the client terminal 200.

As described above, although the host terminal 100 alters its display screen environment to the user interface screen of the client terminal 200 and displays it on the screen, it should be understood that the present invention is not limited thereto. For example, the client terminal 200 may receive information regarding the host terminal 100 from the host terminal 100, alters its display screen environment to a user interface screen based on the received terminal information, and then transmit the altered user interface screen to the host terminal 100.

Figure 2:
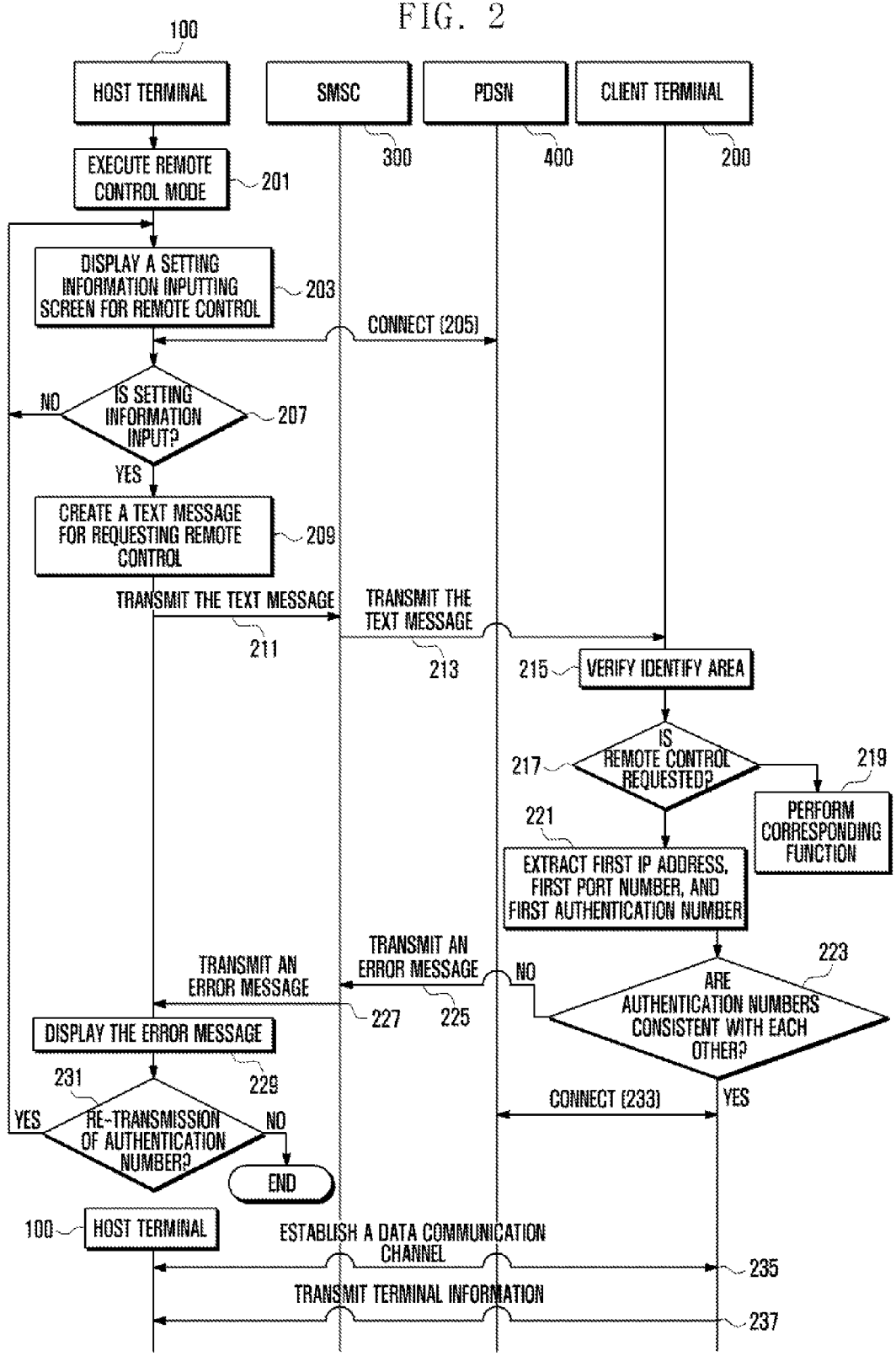
FIG. 2 illustrates a flowchart describing a method for establishing a data communication channel for remote control according to an exemplary embodiment of the present invention.
Figure 3:
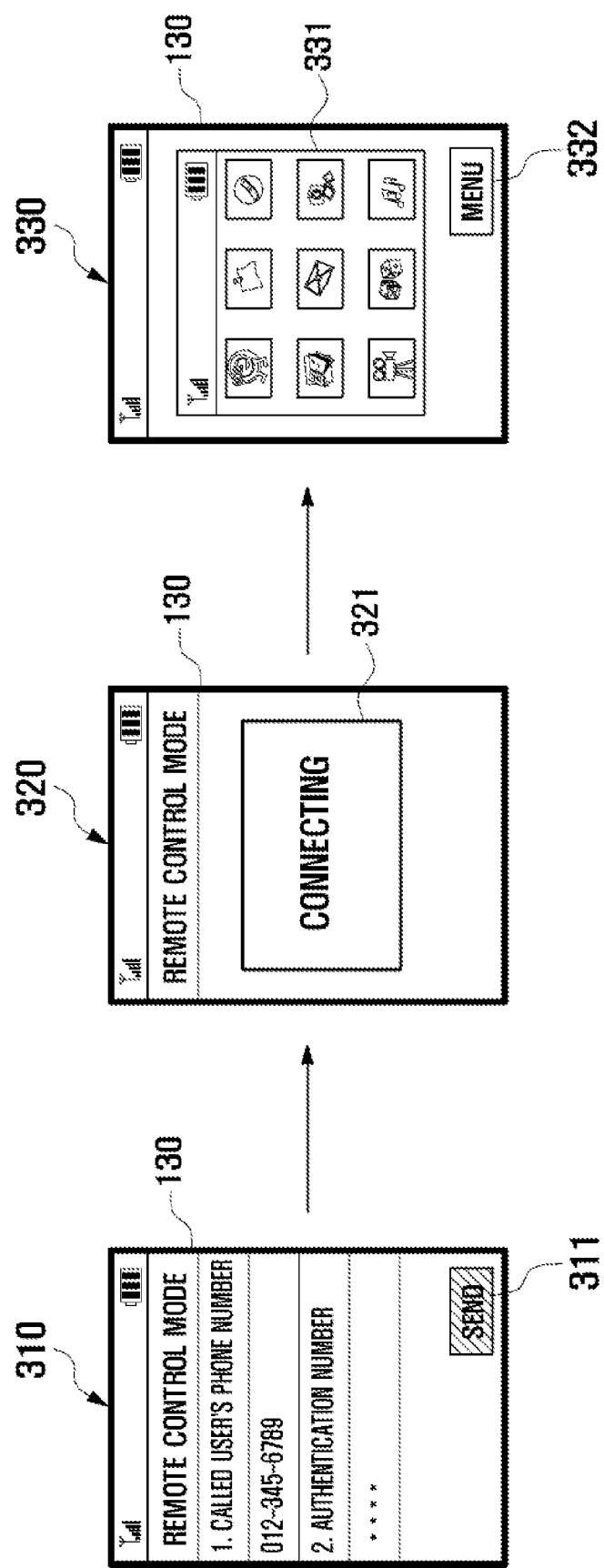
FIG. 3 illustrates a screen of a mobile device during an establishment of a data communication channel according to an exemplary embodiment of the present invention.

FIG. 2 illustrates a flowchart describing a method for establishing a data communication channel for remote control, according to an exemplary embodiment of the present invention. FIG. 3 illustrates a screen of a mobile device during an establishment of a data communication channel according to an exemplary embodiment of the present invention.

Referring to FIGS. 2 and 3, the host terminal 100 executes a remote control mode in step 201. In the remote control mode, the host terminal 100 displays a screen for inputting setting information for the remote control (i.e., a setting information inputting screen) on the display unit in step 203. The host terminal 100 is connected to the PDSN 400 and allocated with a first IP address in step 205. If the PDSN 400 uses the private IP, the host terminal 100 may further receive a first port number from the PDSN 400. The process of connecting to the PDSN 400 may be performed in a state showing a background screen. Alternatively, the process of displaying the setting information inputting screen and the process of connecting to the PDSN 400 may be performed in a different order as described above. Alternatively, the process of displaying the setting information inputting screen and the process of connecting to the PDSN 400 may be simultaneously performed. Alternatively, the process of connecting to the PDSN 400 may be performed after the setting information has been input and then an instruction for transmitting a text message has also been input because it takes a relatively short time, for example, a few seconds, to perform the process of connecting to the PDSN 400.

Thereafter, the host terminal 100 determines whether the setting information (i.e., a phone number and a first authentication number of the client terminal 200) is input in step 207. If the host terminal 100 determines that the setting information has not been input in step 207, the host terminal 100 returns to step 203. On the contrary, if the host terminal 100 determines that the setting information has been input in step 207, the host terminal 100 creates a text message for requesting remote control in step 209. For example, as illustrated in diagram 310 in FIG. 3, if the user inputs the called user's phone number (i.e., the phone number of the client terminal 200) and the first authentication number, and then operates the transmission key 311, the host terminal 100 may create a text message for requesting remote control.

The host terminal 100 creates the text message by inserting an identifier for requesting remote control into the identifier area (e.g., the PID area), the phone number of the client terminal 200 into the Service Center Address (SCA) area, and the first IP address allocated by the PDSN 400, the first port number, and the first authentication number into the User Data (UD) area where text message data is stored.

Thereafter, the host terminal 100 transmits the text message to the SMSC 300 in step 211. After the host terminal 100 has transmitted the text message, the host terminal 100 may display a pop-up screen 321 stating 'Connecting' to the client terminal 200 on the display unit 130, as illustrated in diagram 320 in FIG. 3.

The SMSC 300 receives the text message, identifies the SCA area in the text message storing the phone number, and transmits the text message to the client terminal 200 in step 213.

The client terminal 200 receives the text message and identifies the identifier area (i.e., the PID area) in the text message in step 215. Thereafter, the client terminal 200 determines whether the text message corresponds to a remote control request in step 217. If the client terminal 200 determines that the text message does not correspond to a remote control request in step 217, the client terminal 200 performs a corresponding function in step 219. For example, the client terminal 200 outputs sound effects via a speaker or operates a vibration motor in order to alert the reception of a text message. On the contrary, if the client terminal 200 determines that the text message corresponds to a remote control request in step 217, the client terminal 200 extracts the first IP address, the first port number, and the first authentication number of the host terminal 100, from the text message in step 221. Thereafter, the client terminal 200 determines whether the first authentication number is consistent with the second authentication number stored therein in step 223.

If the client terminal 200 determines that the first authentication number is not consistent with the second authentication number in step 223, the client terminal 200 creates an error message stating authentication failure and transmits the error message to the SMSC 300 in step 225. The SMSC 300 transmits the received error message to the host terminal 100 in step 227. Alternatively, the client terminal 200 may transmit the error message to the host terminal 100 using the first IP address and the first port number.

The host terminal 100 displays the error message on the display unit 130 in step 229. Thereafter, the host terminal 100 determines whether to re-transmit an authentication number in step 231. For example, the host terminal 100 may display a pop-up window (not illustrated) stating whether to retransmit the authentication number on one side of the display unit 130. If the user does not select the re-transmission of the authentication number in step 231, the host terminal 100 terminates the remote control mode. On the contrary, if the user has selected the re-transmission of an authentication number in step 231, the host terminal 100 returns to step 203. In this case, the host terminal 100 may display the setting information inputting screen on the display unit 130, in a state where the previously input phone number of the client terminal 200 is input to the setting information inputting screen. However, it should be understood that the present invention is not limited thereto. For example, if the user has selected the re-transmission of the authentication number, the host terminal 100 display an authentication number inputting window (not illustrated) for re-inputting the authentication number on one side of the display unit 130. If an authentication number has been input to the authentication number inputting window, the host terminal 100 re-transmits the authentication number in the format of a text message to the client terminal 200.

On the contrary, if the client terminal 200 determines that the first authentication number is consistent with the second authentication number in step 223, the client terminal 200 is connected to the PDSN 400 and allocated with a second IP address and second port number from the PDSN 400 in step 233. Thereafter, the client terminal 200 and the host terminal 100 establish the data communication channel with each other, using the first IP address and the second IP address and the first port number and the second port number in step 235. When the client terminal 200 and the host terminal 100 are connected to each other via the data communication channel, the client terminal 200 transmits its terminal information, containing a resolution, an input mode, a key map, and the like, to the host terminal 100 in step 237 to allow the host terminal 100 to properly alter its user interface screen environment to that of the client terminal 200 based on the terminal information regarding the client terminal 200. For example, as illustrated in diagram 330 in FIG. 3, the host terminal 100 may display the user interface screen 331 of the client terminal 200 on the display unit 130. Referring to diagram 330 in FIG. 3, the host terminal 100 alters the user interface screen 331 of the client terminal 200 to a smaller screen than the display unit 130 and displays the smaller screen on the display unit 130. In this case, the host terminal 100 may display a menu key 332 at the bottom on the display unit 130. The menu key 332 includes a menu for terminating a remote control function, a menu for altering the size of the user interface screen of the client terminal 200, and the like. It should be understood that where the user interface screen is displayed on the display unit is not limited thereto. For example, the host terminal 100 may display the user interface screen, transmitted from the client terminal 200, on the entire screen of the display unit 130.

The process of establishing a data communication channel between the host terminal 100 and the client terminal 200 in order to perform remote control has been described above. A remote control method where the host terminal 100 remotely controls the client terminal 200 via the user interface screen of the client terminal 200 will be described below with reference to FIG. 4.

Figure 4:
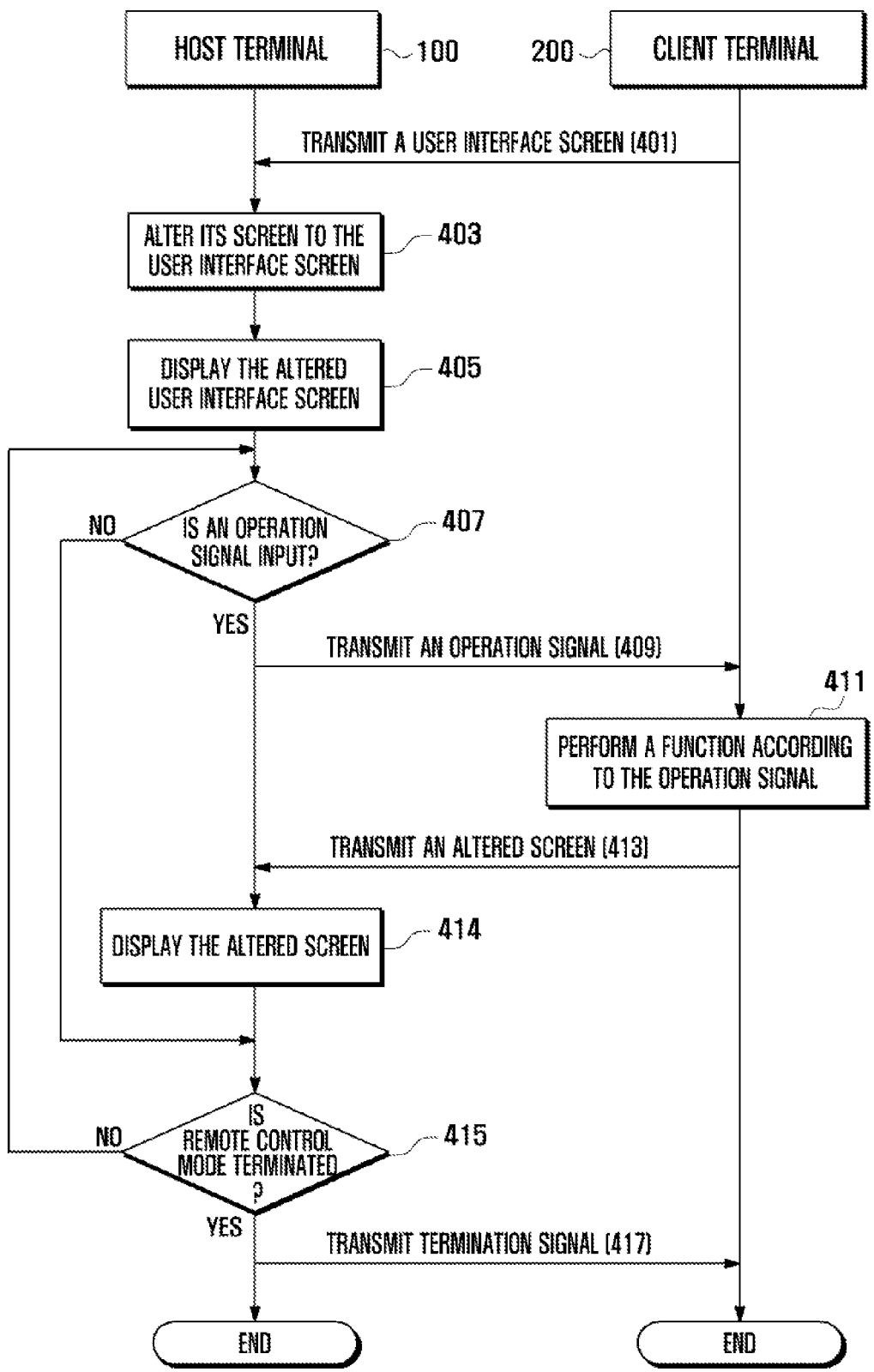
FIG. 4 illustrates a flowchart describing a method for performing remote control between a host terminal and a client terminal via a data communication channel according to an exemplary embodiment of the present invention.

FIG. 4 illustrates a flowchart describing a method for performing remote control between a host terminal and a client terminal via a data communication channel according to an exemplary embodiment of the present invention.

Referring to FIG. 4, the client terminal 200 transmits its user interface screen (e.g., idle screen) to the host terminal 100 in step 401. In step 403, the host terminal 100 alters the received user interface screen to a proper screen environment, using terminal information received in step 237 of FIG. 2. Thereafter, the host terminal 100 displays the altered user interface screen on the display unit 130 in step 405. For example, the host terminal 100 resizes the user interface screen according to a preset resolution. If the host terminal 100 has a larger display unit than the client terminal 200, the host terminal 100 extends and displays the received user interface screen of the client terminal 200 to the same size as its display unit 130 or maintains and displays the original size of the received user interface screen of the client terminal 200. On the other hand, if the host terminal 100 has a smaller display unit than the client terminal 200, the host terminal 100 reduces and displays the received user interface screen of the client terminal 200 being equal to or smaller than the size of its display unit. This is to assist the user to easily perform corresponding operations, such as scrolling the user interface screen of the client terminal 200, on the display unit 130 of the host terminal 100.

If the host terminal 100 employs a touch input mode and the client terminal 200 is equipped with a key button mechanism, the host terminal 100 may display a user interface screen and a virtual keypad corresponding to the key button mechanism of the client terminal 200 on the display unit 130. If the host terminal 100 detects a touch on a particular region in the virtual keypad, the host terminal 100 may transmit a key operation signal corresponding to the touch detected region to the client terminal 200 via the data communication channel.

Alternatively, if both of the host terminal 100 and the client terminal 200 employ a touch input mode, the host terminal 100 alters the user interface screen of the client terminal 200 to a proper screen and displays the user interface screen on the display unit 130. If the host terminal 100 detects a touch on a particular region, the host terminal 100 may transmit a touch signal (i.e., coordinate information) corresponding to the touch detected region to the client terminal 200 via the data communication channel.

In addition, if the host terminal 100 and the client terminal 200 are both equipped with a key button mechanism, the host terminal 100 may receive a user interface screen and key map information of the client terminal 200. If the host terminal 100 detects a particular key that is pressed, the host terminal 100 acquires a key operation signal corresponding to the pressed key, referring to the key map information, and transmits the key operation signal to the client terminal 200.

Alternatively, if the host terminal 100 is equipped with a key button mechanism and the client terminal 200 employs a touch input mode, the host terminal 100 displays a user interface screen and a pointer of the client terminal 200 on the display unit 130. The host terminal 100 may move the pointer on the display unit 130 according to direction key signals and may transmit a touch signal, corresponding to a region where the pointer is located when a confirmation key is pressed, to the client terminal 200 via the data communication channel.

After displaying the user interface screen in step 405, the host terminal 100 determines whether an operation signal is input to request for performing a function in the client terminal 200 in step 407. If the host terminal 100 determines that an operation signal is input in step 407, the host terminal 100 transmits the operation signal to the client terminal 200 in step 409. The client terminal 200 performs a function corresponding to the received operation signal in step 411. Thereafter, the client terminal 200 transmits a screen altered accordingly as the function is performed to the host terminal 100 in step 413. For example, if the operation signal corresponds to a call log request signal, the client terminal 200 displays a call log screen and transmits the call log screen to the host terminal 100. The host terminal 100 receives the altered screen and displays the altered screen on the display unit 130 in step 414.

Thereafter, the host terminal 100 determines whether a remote control mode termination signal is input in step 415. If the host terminal 100 determines that a remote control mode termination signal has not been input in step 415, the host terminal 100 returns to step 407. On the contrary, if the host terminal 100 determines that a remote control mode termination signal has been input in step 415, the host terminal 100 transmits a remote control mode termination signal to the client terminal 200 and terminates the remote control mode in step 417.

Meanwhile, if the host terminal 100 determines that an operation signal has not been input in step 407, the host terminal 100 determines whether a remote control mode termination signal is input in step 415, as described above.

Although an exemplary embodiment of the present invention has been described in such a way that the host terminal 100 alters the user interface screen of the client terminal 200 and displays the altered screen on the display unit 130, it should be understood that the present invention is not limited thereto. For example, the client terminal 200 may alter its user interface screen and then transmit the altered screen to the host terminal 100. Additionally, the host terminal 100 may include its terminal information for altering the user interface screen in the text message for requesting remote control and transmit the text message to the client terminal 200. Alternatively, the host terminal 100 may transmit its terminal information for altering the user interface screen to the client terminal 200 via the data communication channel.

The client terminal 200 may be remotely controlled in a state showing a background screen until the remote control is terminated since it has received the remote control request text message from the host terminal 100, so that the remote control state cannot be exposed from the client terminal 200.

Figure 5:
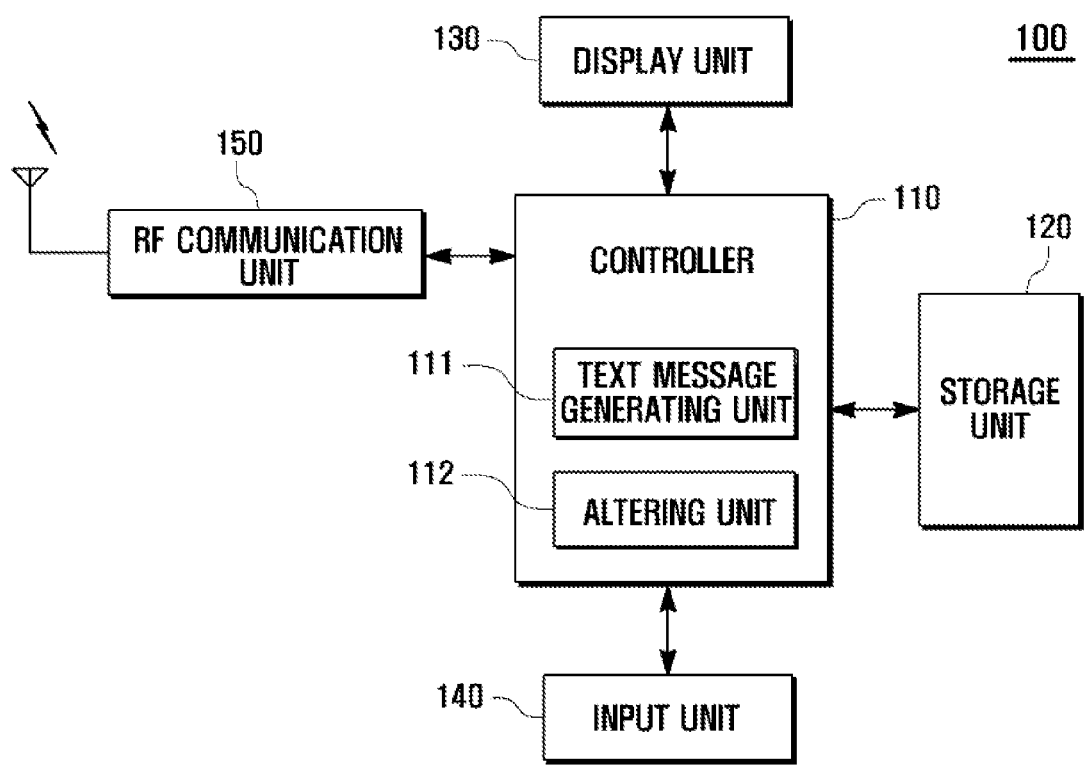
FIG. 5 illustrates a schematic block diagram of a mobile device according to an exemplary embodiment of the present invention.

FIG. 5 illustrates a schematic block diagram of a mobile device according to an exemplary embodiment of the present invention. Although the mobile device of FIG. 5 will be described based on the host terminal 100 as described above, it should be noted that the mobile device may also be applied to the client terminal 200.

Referring to FIG. 5, the mobile device 100 includes a controller 110, an input unit 140, an RF communication unit 150, a storage unit 120, and a display unit 130. The controller 110 includes a text message generating unit 111 and an altering unit 112.

The RF communication unit 150 transmits and receives voice signals for a call function and packet data for data communication to and from external systems. The RF communication unit 150 includes a transmission/reception signal separating unit (not illustrated) for separating a signal received via an antenna and a signal to be transmitted. The RF communication unit 150 further includes an RF transmitter (not illustrated) for up-converting the frequency of signals to be transmitted and amplifying the signals. The RF communication unit 150 also includes an RF receiver (not illustrated) for low-noise amplifying received RF signals and down-converting the frequency of the received RF signals. In an exemplary implementation, the RF communication unit 150 transmits a connection request signal to the PDSN 400 and receives a first IP address and a first port number therefrom in a remote control mode. The RF communication unit 150 also transmits a text message for requesting remote control to the SMSC 300. The text message may contain a phone number, a first IP address, a first port number, a first authentication number, and an identifier representing that the text message is a remote control request message. If the first authentication number transmitted from the host terminal 100 is compared with the second authentication number stored in the client terminal 200 in order to perform remote control authentication and the first authentication number and the second authentication number are not consistent with each other, the RF communication unit 150 may receive an error message from the client terminal 200. The RF communication unit 150 receives information regarding the client terminal 200, for example, a resolution, an input mode, a key map, and the like, and a user interface screen of the client terminal 200, via a data communication channel. The RF communication unit 150 transmits operation signals, for remotely controlling the client terminal 200, to the client terminal 200 and receives a user interface screen altered according to the operation signals therefrom, via the data communication channel. If the remote control mode is terminated, the RF communication unit 150 transmits a remote control termination signal to the client terminal 200.

The display unit 130 displays screen data created as the mobile device is operated, user's input events, state information according to the key operations, function-setting information for the mobile device, and the like. For example, the display unit 130 may display a boot screen, an idle screen, menu screens, a video call screen, a document edit screen, and the like. In an exemplary implementation, the display unit 130 displays a screen for inputting setting information to request remote control when a remote control mode is executed. If a data communication channel for remote control has been established between the host terminal 100 and the client terminal 200, the display unit 130 displays a user interface screen of the client terminal 200 under the control of the controller 110. The display unit 130 may display the user interface screen of the client terminal 200 on the entire screen or in a preset size. The display unit 130 may display a pointer or a virtual keypad according to the input mode employed by the host terminal 100 and the client terminal 200. The display unit 130 may be implemented with a Liquid Crystal Display (LCD), an Organic Light Emitting Diode (OLED), and the like. If the display unit 130 is implemented with a touch screen, the display unit 130 may also serve as an input mechanism.

The input unit 140 is configured to include a number of input keys and function keys that allow a user to input number or letter information and to set and control a variety of functions. The keys may include a call key for requesting a call, a video call key, a volume key for adjusting an audio volume, and directional keys including, for example, at least four directions.

The storage unit 120 stores an Operating System (OS) of the mobile device, applications related to options, and user data. The options may include audio playback, image or moving image reproduction, broadcast signal reproduction, and the like. The storage unit 120 also stores a program for connecting to a packet data serving node, an instant messenger program, an email program, and the like. The storage unit 120 further stores received emails, document files, text messages, and the like. In an exemplary implementation, the storage unit 120 may store an application program for creating a text message and a conversion program for altering a user interface screen of the client terminal 200 to a screen that follows an environment of the display unit 130 of the host terminal 100. The text message contains an identifier representing that a text message is a remote control request message, and a phone number, a first IP address, a first port number and a first authentication number of the client terminal 200.

The controller 110 controls an entire operation of the mobile device and a flow of signals among the components in the mobile device. In an exemplary implementation, the controller 110 performs a control operation so that the mobile device is connected to the PDSN 400 when a remote control mode is executed. After the mobile device is connected to the PDSN 400, the controller 110 receives the first IP address and/or the first port number from the PDSN 400. The controller 110 performs a control operation so that the mobile device may be connected to the PDSN 400 when it executes the remote control mode and also displays a screen for inputting setting information for the remote control on the display unit 130. If the setting information, for example, the phone number and the first authentication number of the client terminal 200, is input to the mobile device, the controller 110 creates a text message that contains the phone number, the first IP address, the first port number, the first authentication number, and an identifier representing that the text message is a remote control request message. Additionally, the controller 110 includes the text message generating unit 111.

After the controller 110 has transmitted the remote control request text message, the controller 110 determines whether the RF communication unit 150 receives a data communication channel connection request transmitted from the client terminal 200. During this process, the controller 110 controls the display unit 130 to display a pop-up window stating that it is waiting a signal requested for the data communication channel connection from the client terminal 200.

If the controller 110 receives the signal requested for the data communication channel connection, the controller 110 establishes a data communication channel with the client terminal 200. The controller 110 receives a user interface screen of the client terminal 200 (e.g., an idle screen) via the data communication channel. The controller 110 also receives terminal information regarding the client terminal 200, for example, the resolution, the input mode, the key map, and the like, from the client terminal 200. This is to allow the host terminal 100 to properly alter its user interface screen environment to that of the client terminal 200 based on the terminal information of the client terminal 200 if the terminal information differs between the host terminal 100 and the client terminal 200. Therefore, the user may easily conduct the remote control of the client terminal 200. Additionally, the controller 110 includes the altering unit 112 that performs an altering operation with respect to the user interface screen of the client terminal 200, using the terminal information.

The controller 110 transmits operation signals for remotely controlling the client terminal 200 to the client terminal 200 via the data communication channel. The controller 110 receives a user interface screen, altered according to the operation signals, from the client terminal 200 and displays the altered screen on the display unit 130.

If the controller 110 receives an error message, representing that the first and second authentication numbers are not consistent with each other, from the client terminal 200 via the RF communication unit 150, the controller 110 may display an authentication number inputting window for allowing the user to re-input the authentication number on the display unit 130. The controller 110 may display a setting information inputting screen in which the phone number of the client terminal 200 is automatically input on the display unit 130. Thereafter, the controller 110 may transmit a text message of the re-input authentication number to the client terminal 200 via the SMSC 300.

As described above, the method and system for remotely controlling a mobile device, according to exemplary embodiments of the present invention, allows a user to remotely control all functions of his/her mobile device, such as a phonebook search, a text message verification, setting information alteration, and the like, using a particular mobile device, thereby providing the user with mobile device use convenience. For example, if a user lost his/her mobile device, he/she may access his/her lost mobile device using a particular mobile device and alter the password therein to prevent the person who found his/her mobile device from using it. In addition, the method and system can allow a particular mobile device to receive a user interface screen from a remote mobile device, via a data communication channel, during the remote control, and to provide the same user interface as the remote mobile device to the user, so that the user can remotely control the remote mobile device via the particular mobile device.

While the present invention has been shown and described with reference to certain exemplary embodiments thereof, it will be understood by those skilled in the art that variations changes in form and details may be made therein without departing from the spirit and scope of the invention as defined in the appended claims and their equivalents.

What is claimed is:

1. A remote control method, the method comprising:
connecting a host terminal to a Packet Data Serving Node (PDSN) and allocating a first Internet Protocol (IP) address to the host terminal when a remote control mode is executed;
creating, by the host terminal, a text message for requesting the remote control mode comprising the first IP address, and transmitting the text message to a client terminal;
connecting the client terminal to the PDSN and allocating a second IP address to the client terminal;
establishing a data communication channel between the host terminal and the client terminal using the first IP address and the second IP address; and
remotely controlling, by the host terminal, the client terminal via the data communication channel,
wherein the creating of the text message for requesting the remote control mode comprises receiving a phone number of the client terminal and a first authentication number for authenticating the remote control mode, and the text message comprises an identifier representing the remote control request, the phone number, the first IP address, and the first authentication number.

2. The method of claim 1, wherein the allocating of the first IP address to the host terminal comprises allocating, by the PDSN, a first port number to the host terminal, and
wherein the allocating of the second IP address to the client terminal comprises allocating, by the PDSN, a second port number to the client terminal.

3. The method of claim 1, wherein the establishing of the data communication channel comprises:
extracting, by the client terminal, the first IP address and the first authentication number from the received text message; determining, by the client terminal, whether the first authentication number and the second authentication number are consistent with each other;
requesting, by the client terminal, the data communication channel connection from the host terminal if the first authentication number and the second authentication number are consistent with each other; and
receiving, by the client terminal, an acceptance message in response to the data communication channel connection request from the host terminal and establishing the data communication channel.

4. The method of claim 3, further comprising:
transmitting an error message from the client terminal to the host terminal if the first authentication number and the second authentication number are not consistent with each other.

5. The method of claim 1, wherein the remotely controlling of the client terminal comprises:
transmitting a user interface screen from the client terminal to the host terminal;
displaying the user interface screen on the host terminal;
transmitting an operation signal from the host terminal to the client terminal;
performing a function in the client terminal, according to the operation signal; and
transmitting a screen altered accordingly as the function is performed from the client terminal to the host terminal.

6. The method of claim 5, wherein the remotely controlling of the client terminal further comprises transmitting terminal information regarding the client terminal to the host terminal, the terminal information comprising at least one of a resolution, an input mode, and a key map.

7. The method of claim 6, wherein the displaying of the user interface screen on the host terminal comprises:
altering, by the host terminal, the user interface screen to its screen environment according to the terminal information.

8. The method of claim 5, wherein the establishing of the data communication channel and the performing of the function in the client terminal according to the operation signal are performed in a state showing a background screen on the client terminal.

9. A remote control system, the system comprising:
a host terminal for transmitting a remote control request text message in a remote control mode;
a client terminal for receiving the remote control request text message;
a Short Message Service Center (SMSC) for forwarding the remote control request text message from the host terminal to the client terminal; and
a Packet Data Serving Node (PDSN) for allowing a connection of the host terminal and the client terminal and allocating a first IP address and second IP address to the host terminal and the client terminal, respectively,
wherein the remote control request text message includes the first IP address,
the host terminal transmits the remote control request text message to the client terminal via the SMSC, and
the client terminal establishes a data communication channel with the host terminal via the PDSN, using the first IP address and the second IP address,
wherein the host terminal receives a first authentication number for authenticating the remote control mode and a phone number of the client terminal, creates the remote control request text message, and transmits the remote control request text message to the SMSC, and further wherein the remote control request text message comprises the first authentication number, the phone number, the first IP address, and an identifier representing the remote control request text message.

10. The system of claim 9, wherein the PDSN further allocates a first port number and a second port number to the host terminal and the client terminal, respectively, when the host terminal and the client terminal are connected to the PDSN.

11. The system of claim 9, wherein the client terminal receives the remote control request text message and establishes the data communication channel with the host terminal if the first authentication number is consistent with a second authentication number stored in the client terminal.

12. The system of claim 11, wherein the client terminal transmits an error message to the host terminal if the first authentication number is not consistent with the second authentication number.

13. The system of claim 9, wherein the client terminal transmits a user interface screen to the host terminal when establishing the data communication channel with the host terminal.

14. The system of claim 13, wherein the client terminal further transmits terminal information comprising at least one of a resolution, an input mode, and a key map, to the host terminal.

15. The system of claim 14, wherein the host terminal alters the user interface screen to the host terminal's screen environment, according to the terminal information, and displays the altered screen.

16. The system of claim 9, wherein the client terminal is remotely controlled in a state showing a background screen until the remote control is terminated when the client terminal receives the remote control request text message.

17. A remote control method of a mobile device, the method comprising:
- acquiring a first IP address when a remote control mode is executed;
- inputting a phone number of a client terminal to be remotely controlled;
- creating a remote control request text message comprising the phone number, the first IP address, and an identifier representing that the text message requests the remote control;
- transmitting the remote control request text message to the client terminal;
- receiving a data communication channel connection request from the client terminal;
- transmitting a message for accepting the data communication channel connection request to the client terminal and establishing the data communication channel with the client terminal; and
- receiving a user interface screen of the client terminal via the data communication channel and remotely controlling the client terminal.

18. The method of claim 17, further comprising:
transmitting terminal information from the client terminal comprising at least one of a resolution, an input mode and a key map.

* * * * *